(12) United States Patent
Strazzanti

(10) Patent No.: US 6,902,307 B2
(45) Date of Patent: *Jun. 7, 2005

(54) TAILLIGHT APPARATUS AND METHOD OF MAKING

(75) Inventor: Michael Strazzanti, Gates Mills, OH (US)

(73) Assignee: Illume, L.L.C., Gates Mills, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/465,690

(22) Filed: Jun. 19, 2003

(65) Prior Publication Data

US 2003/0206418 A1 Nov. 6, 2003

Related U.S. Application Data

(63) Continuation-in-part of application No. 10/442,035, filed on May 20, 2003, which is a continuation-in-part of application No. 10/419,519, filed on Apr. 21, 2003, and a continuation-in-part of application No. PCT/US02/16161, filed on May 22, 2002, which is a continuation-in-part of application No. 10/108,827, filed on Mar. 27, 2002, now Pat. No. 6,550,943, which is a continuation-in-part of application No. 09/967,437, filed on Sep. 28, 2001, now Pat. No. 6,558,026, which is a continuation-in-part of application No. 09/865,402, filed on May 25, 2001, now Pat. No. 6,491,416.
(60) Provisional application No. 60/441,814, filed on Jan. 22, 2003.

(51) Int. Cl.⁷ .................................................. B60Q 1/26
(52) U.S. Cl. ...................... 362/541; 362/318; 362/464; 362/513
(58) Field of Search .................. 362/464, 513, 362/541, 465, 466, 318; 315/82–83; 427/106–107

(56) References Cited

U.S. PATENT DOCUMENTS

| | | |
|---|---|---|
| 2,628,927 A | 2/1953 | Colbert et al. |
| 2,740,732 A | 4/1956 | Peck et al. |
| 3,001,901 A | 9/1961 | Barkley |
| 3,020,376 A | 2/1962 | Hofmann et al. |
| 3,512,876 A | 5/1970 | Marks |
| 3,708,219 A | 1/1973 | Forlini et al. |
| 3,774,152 A * | 11/1973 | Tandy .................. 340/464 |
| 4,142,229 A | 2/1979 | Hulbert, Jr. |
| 4,209,825 A | 6/1980 | Shackelford |
| 4,727,458 A | 2/1988 | Droste et al. |
| 4,814,960 A | 3/1989 | Liu |
| 4,839,779 A | 6/1989 | Kasboske |
| 4,868,726 A | 9/1989 | Segoshi |
| 4,916,431 A * | 4/1990 | Gearey .................. 340/479 |

(Continued)

OTHER PUBLICATIONS

Fujii et al, "Light–Controllable Spot Luminaires Using a Liquid Crystal Light Shuter and a High–Intensity Discharge Lamp", J. Light & Vis., Env. pp. 13–23, vol. 26, No. 1.

*Primary Examiner*—Sandra O'Shea
*Assistant Examiner*—Ali Alavi
(74) *Attorney, Agent, or Firm*—Watts Hoffman Co., L.P.A.

(57) ABSTRACT

The present invention relates to a taillight assembly that includes a light source for emitting light and a light source enclosure having a light transmissive portion for transmitting light from the light source to an illumination zone. A portion of the enclosure includes a material that is affixed to selected regions of the light transmissive portion. By electrically energizing the material the light transmitting properties of the material can be altered for performing different taillight functions. A drive circuit is electrically coupled to the material in each region for selectively energizing the material and thereby controlling the functional light output of each region. All taillight functions can be accomplished by activating the bands on the light transmissive portion, including running light, brake light, reverse light, parking light and turning signal.

33 Claims, 6 Drawing Sheets

U.S. PATENT DOCUMENTS

| | | |
|---|---|---|
| 4,985,816 A | 1/1991 | Seko et al. |
| 5,023,758 A | 6/1991 | Allen et al. |
| 5,111,105 A | 5/1992 | Yamamoto |
| 5,113,319 A | 5/1992 | Sekiguchi et al. |
| 5,438,486 A | 8/1995 | McNair |
| 5,463,491 A | 10/1995 | Check, III |
| 5,467,217 A | 11/1995 | Check, III et al. |
| 5,517,389 A | 5/1996 | Myers |
| 5,660,462 A | 8/1997 | Bockley et al. |
| 5,728,251 A | 3/1998 | Check, III |
| 5,829,870 A | 11/1998 | Remillard et al. |
| 5,938,323 A | 8/1999 | McMahan |
| 6,017,138 A | 1/2000 | Reiss et al. |
| 6,114,405 A | 9/2000 | Zhuang et al. |
| 6,124,907 A * | 9/2000 | Jones et al. .................... 349/96 |
| 6,126,301 A | 10/2000 | Altunay et al. |
| 6,156,239 A | 12/2000 | Saxe et al. |

\* cited by examiner

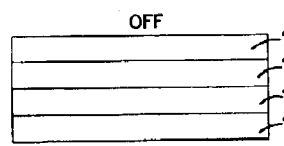
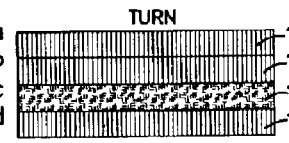
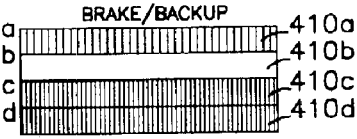
Figure 4a     Figure 4b     Figure 4c
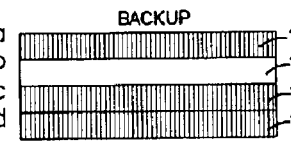
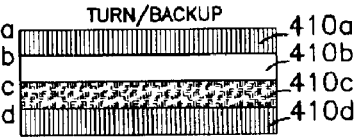
Figure 4d     Figure 4e     Figure 4f
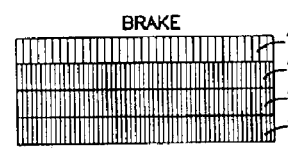
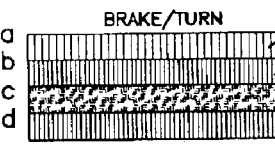
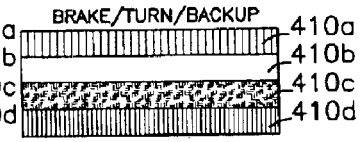
Figure 4g     Figure 4h     Figure 4i
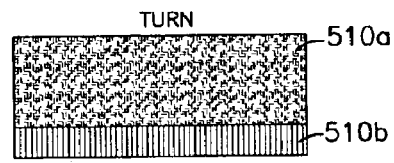
Figure 5a     Figure 5b
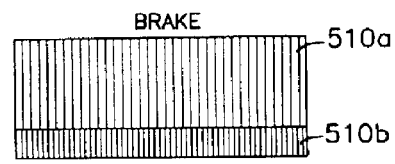
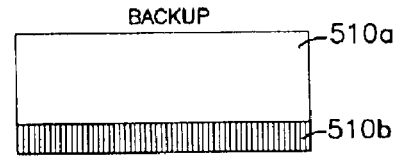
Figure 5c     Figure 5d

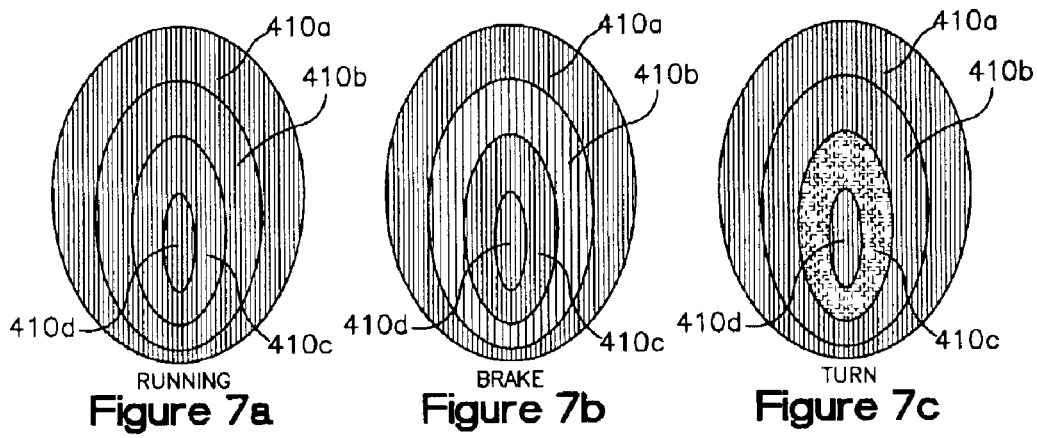
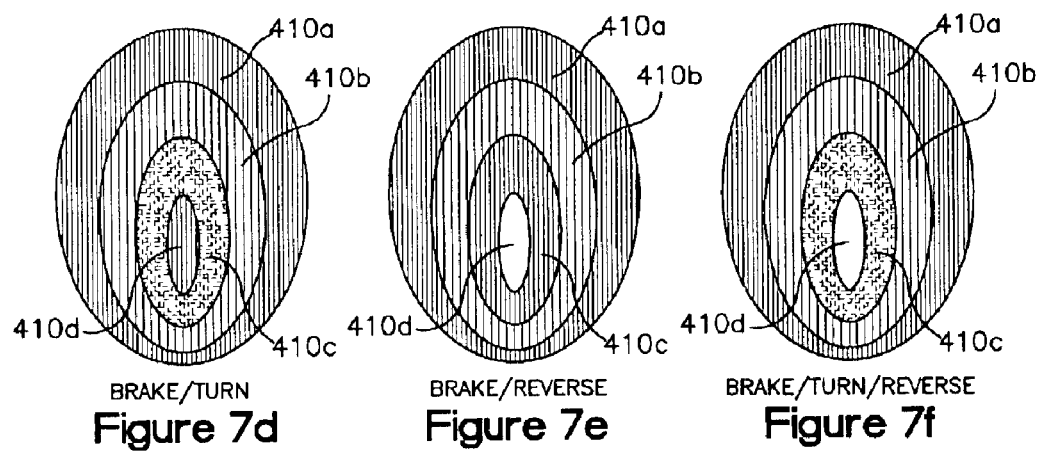
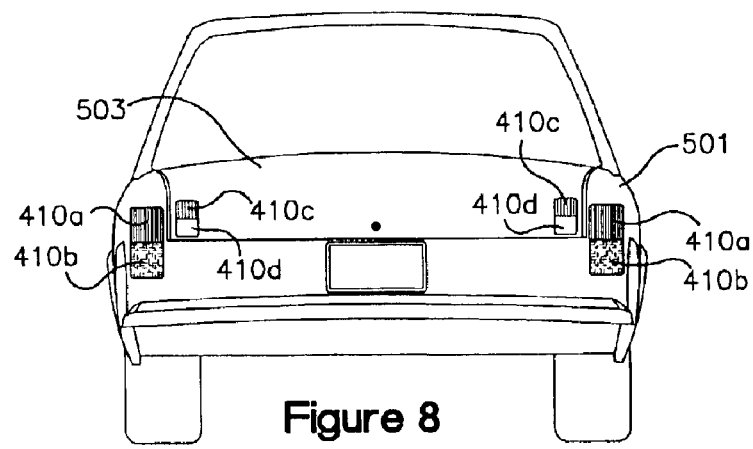
Figure 8
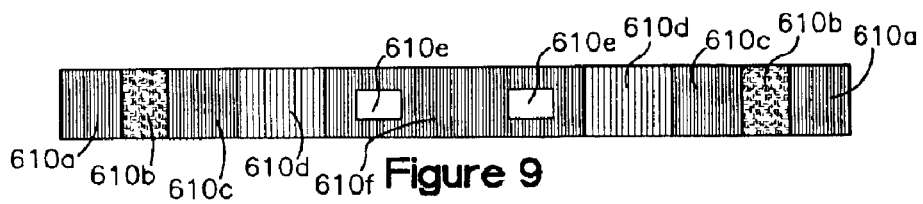
Figure 9

TAILLIGHT APPARATUS AND METHOD OF MAKING

CROSS-REFERENCE TO RELATED APPLICATIONS

The present application is a non-provisional application claiming the benefit of U.S. Provisional Application, Ser. No. 60/441,814 entitled Lamp Masking Method and Apparatus, filed in the United States Patent and Trademark Office on Jan. 22, 2003, and is a continuation in part application containing common subject matter with presently pending U.S. patent application Ser. No. 10/442,035, entitled "LAMP MASKING METHOD AND APPARATUS" filed with the United States Patent and Trademark Office on May 20, 2003, which is a continuation in part of U.S. patent application Ser. No. 10/419,519 which was filed in the United States Patent and Trademark Office on Apr. 21, 2003 and International Patent Application No. PCT/US02/16161 filed May 22, 2002 which are both continuations in part of U.S. patent application Ser. No. 10/108,827 which was filed in the United States Patent and Trademark Office on Mar. 27, 2002, now U.S. Pat. No. 6,550,943, issued Apr. 22, 2003, which is a continuation in part containing common subject matter with U.S. application Ser. No. 09/967,437 which was filed in the United States Patent and Trademark office on Sep. 28, 2001, now U.S. Pat. No. 6,558,026, issued May 6, 2003, which is a continuation in part containing common subject matter U.S. patent application Ser. No. 09/865,402 which was filed in the United States Patent and Trademark Office on May 25, 2001 and which is entitled "Headlamp Masking Method and Apparatus," now U.S. Pat. No. 6,491,416, issued Dec. 10, 2002. The subject matter of these co-pending patent applications and issued patents is incorporated herein by reference in their entirety.

FIELD OF THE INVENTION

The present invention relates generally to motor vehicles and more specifically to a taillight for such motor vehicles.

BACKGROUND

Vehicle taillights typically include several sections each having their own lamp bulb. A lens cover for each section is dyed to correspond to the taillight function being performed by that section. For instance, the reverse light section is clear while the turn section is dyed amber. In addition, the largest section of the taillight is the brake section which is dyed red. By using multiple lamp bulbs and having several sections to accomplish all the necessary lighting for a taillight, the taillight takes on a bulky configuration with increased weight.

There is a need in the art for a taillight that can accomplish all of the taillight functions using a single taillight enclosure.

SUMMARY OF THE INVENTION

The present invention concerns a taillight assembly for use in a motor vehicle. According to the present invention, the creation of all necessary rear lighting on an automobile or truck is accomplished with a single light source. The present invention accomplishes this while maintaining running lamp appearance during all functions of the taillight as well as retaining the different colors of the various taillight functions. With implementation of the present invention, many styling options are possible including the incorporation of new shapes for the overall lamp, company logos into the design and new organization of light output areas.

Another aspect of the invention is the implementation of a backup light using the common light source of the other lamp functions.

The taillight assembly includes a light source for emitting light and a light source enclosure having a light transmissive portion for transmitting light from the light source to an illumination zone. A portion of the enclosure includes a material that is fixed in relation to selected regions of the light transmissive portion. By electrically energizing the material the light transmitting properties of the material can be altered for performing different taillight functions. A drive circuit is electrically coupled to the material in each region for selectively energizing the material and thereby controlling the functional light output of each region. Taillight functions include running light, brake light, reverse light parking light, and turn signal light. The material can fixed in relation to the light transmissive portion of the enclosure in any fashion. In one embodiment, the material is molded into the light transmissive portion. In anther embodiment, the material is affixed to the inner and or outer surfaces of the light transmissive portion.

It is preferred that the material is made up of liquid crystal material. More preferably, the liquid crystal material is polymer stabilized technology (PST) liquid crystal. The taillight may also include a polarized filter. A filter can be used in one or more regions of the light transmissive portion to improve contrast ratios in those regions during various energized levels of the liquid crystal material. The liquid crystal material may also include dichroic dyes for creating the colors necessary for legal taillight operation. In one embodiment, at least one region is layered with two or more portions of liquid crystal material which are electrically energized to adjust the light transmitting properties and function of the region. The use of stacked liquid crystal material allows the stacked regions to perform multiple taillight functions such as for example brake light and running light.

In another embodiment, the regions on the light transmissive portion are made up of parallel bands or strips.

In yet another embodiment, the drive circuit includes an interface for monitoring multiple inputs that control the light transmitting properties and function of the material. Preferably, one input includes a brake pressure sensor which corresponds to the intensity of the light emitted during braking based on the pressure applied to the brake pedal by the motorist.

In yet another embodiment, the light source is made up of two filaments. A first filament emits low-level light output for low-level light functions and a second filament emits high-level light output for high level light functions.

In one embodiment, the light transmitting portion of a taillight assembly or enclosure is made up of an inner and outer layer. The material is supported between the inner and outer layers of the light transmitting portion. The material of the taillight can include distinct regions that are individually energized by conductors that are routed between the inner and outer layers of the light transmitting portion of the enclosure.

The material may be supported by a separate enclosure cap that positions the material a spaced distance from the light transmitting portion of the enclosure to reduce heat transfer to the material from a light source within the enclosure.

A liquid crystal material can be attached to the light transmitting portion of the enclosure with an adhesive material. The adhesive material is preferably a conductive adhesive that forms a portion of a conductive path between the drive circuit and the material.

In an exemplary embodiment, the drive circuit includes a user interface including a switch selector; a programmable controller for responding to the setting of the switch selector to produce a set of driver outputs; and a driver or energization circuit coupled to the material for applying an alternating signal to the material to alter the light transmitting properties and function of the coating material. The drive circuit includes a control output for adjusting a level and function of light transmission through a region of the material depending upon an activation state of the light source. In addition, the driver circuit applies a direct current (DC) signal output for adjusting the light transmission level of an associated region of the material.

The present invention also contemplates a process for constructing a taillight assembly. The process includes positioning a light source that emits light within an enclosure having a light transmissive portion for transmitting light from the light source to an illumination zone; fixing a material in relation to the enclosure and selected regions of the light transmissive portion, and coupling the material to a drive circuit for selectively energizing the material which when electrically energized alters the light transmitting properties of the material for performing different taillight functions.

These and other objects, advantages and features of the invention will become better understood from a detailed description of an exemplary embodiment of the invention, which is described in conjunction with the accompanying drawings.

BRIEF DESCRIPTION OF THE DRAWINGS

FIGS. 4a through 4i show taillight functions in a four-band liquid crystal design for use in the taillight assembly of the present invention;

FIGS. 5a through 5d show taillight functions in a two-band liquid crystal design for use in the taillight assembly of the present invention;

FIGS. 7a through 7f show taillight functions in an alternative four-band liquid crystal taillight design according to the present invention;

FIG. 8 shows an alternative positioning of taillights for use in a motor vehicle according to the present invention; and FIG. 9 shows a broad-band liquid crystal taillight design according to the present invention.

DETAILED DESCRIPTION

Figure 1:
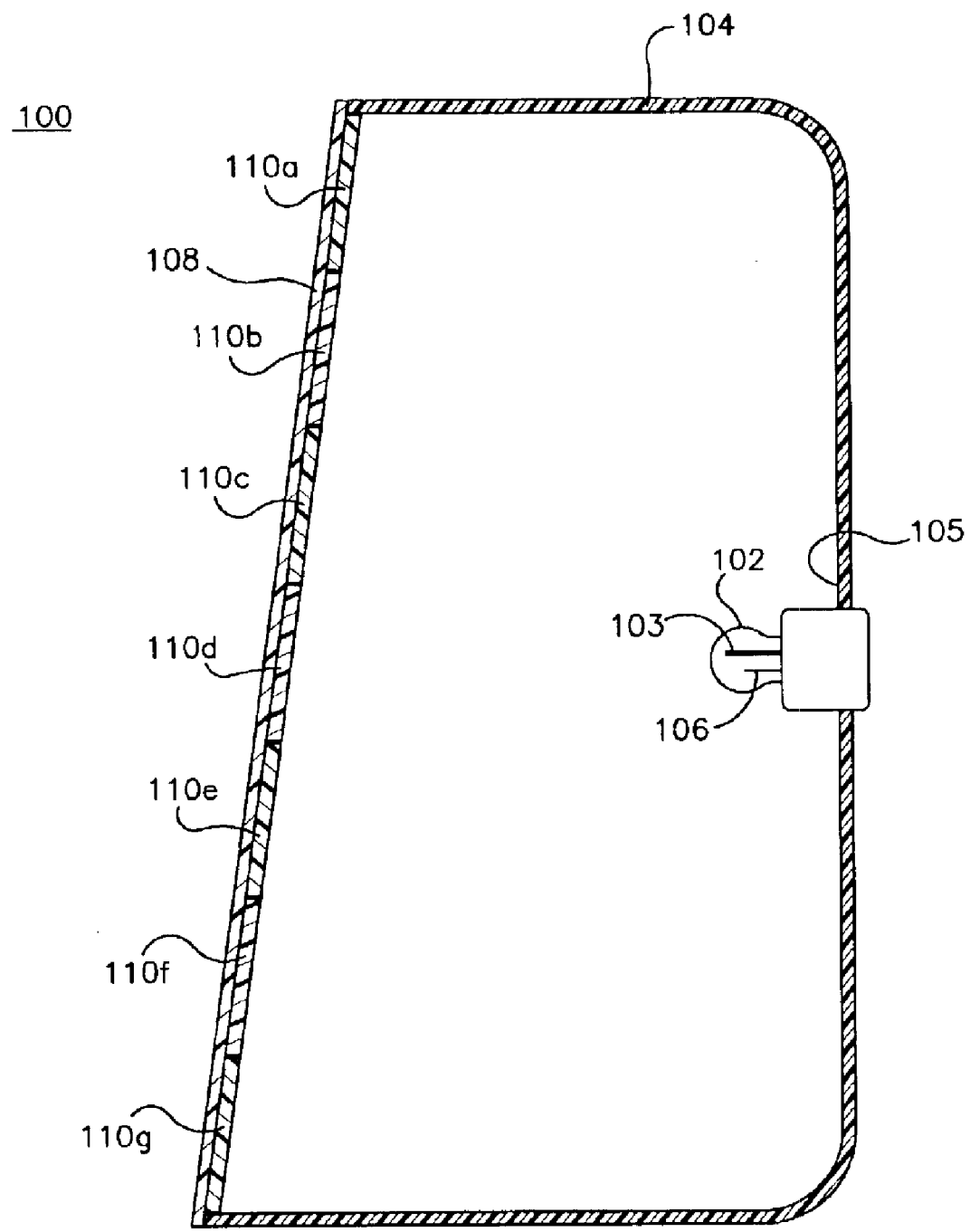
FIG. 1 is a cross-sectional view of a taillight assembly according to the present invention.

Turning now to the figures, FIG. 1 illustrates a taillight assembly 100 that includes a light source 102 for emitting light mounted to an enclosure 104 having a light transmissive portion or lens 108 for emitting light from the light source 102 to an illumination zone in front of the taillight assembly 100 but to the back or behind a vehicle to which the taillight assembly is mounted. In a preferred embodiment, the light source 102 is a bulb having two filaments, a major filament 103 and a minor filament 106. An interior surface 105 of the enclosure 104 reflects light reaching the surface 105 back into the enclosure interior so that it will exit the enclosure through the light transmissive portion 108. The light transmissive portion 108 of the enclosure has affixed thereto at specified regions a material. When these regions are electrically energized the material is rendered more light transmissive to alter the amount of light transmitted from the light source 102 to the illumination zone. A drive circuit 200 (see FIG. 2) electrically coupled to the regions of material energizes the material and thereby controls a light output function from the taillight assembly. In addition, the taillight assembly may include a reflector having various shaped facets and optics to create the light field output levels necessary for SAE and FMVSS tail lamp, brake, turn signal, parking or backup lamp standards.

In accordance with the exemplary embodiment of the invention, the light transmissive portion or lens 108 of the enclosure 104 has affixed thereto seven bands 110a, 110b, 110c, 110d, 110e, 110f and 110g. In this illustrative embodiment, the bands extend across a generally planar, rear-facing surface of the taillight assembly 100. These bands are independently energized to adjust the function and light output from the taillight assembly 100. The opacity and color of the bands 110a, 110b, 110c, 110d, 110e, 110f and 110g of material are selectively controlled to adjust the function and light output to produce a running light, brake light, turning light, parking light and reverse light. The bands 110a, 110b, 110c, 110d, 110e, 110f and 110g are preferably made up of liquid crystal material. One example of liquid crystal material is polymer stabilized technology (PST) liquid crystal and is available from the Liquid Crystal Institute at Kent State University having a principle place of business at Summit Street, Kent, Ohio 44242. The PST material is also disclosed in U.S. Pat. Nos. 6,515,649, 6,249,271 and 5,251,048, hereby incorporated by reference in their entirety. The material can be shaped as needed and applied to the light transmissive portion of the enclosure.

The light source 102 can be any light source as know to those of skill in the art included but not limited High Intensity Discharge (HID), halogen, fluorescent, incandescent, neon and high intensity light emitting diode/diodes. In addition, single or dual filaments bulbs may be employed. In the case of a dual filament bulb, it is preferred that one filament produce a lower intensity light output for low intensity applications such as running light and one filament produce a higher intensity light output for higher intensity applications such as a reverse light. An example of a dual filament bulb is disclosed under SAE 3157 having a major filament light output of 32 MSCP or 408 Lumens and a minor filament with a light output of 3 MSCP or 37.7 lumens. Liquid crystal material may be energized to block, scatter or reflect light in a proportional ratio to that of the filament. In a preferred embodiment, for example, if the ratio of light output from the minor filament to the major filament of the light source is 3:32, then the light-blocking ratio of the liquid crystal between the full on and off states should be at least 11:1. In addition, one or more polarized filter layers may be incorporated into the one or more bands of the lens to improve contrast ratios in those regions during various energized levels of the liquid crystal material.

The material may be affixed to the inside of the light transmissive portion or lens 108 with a translucent adhesive to protect the material from weathering that would occur outside the lens 108. The material may also be applied to an outer surface of the lens 108 using a protective laminate. Additionally, the material may be a prefabricated panel which is clipped or locked into place when the taillight assembly enclosure is constructed. Further, the liquid crystal may be insert molded into the clear lens with a wire lead embedded in the lens for electrical contact with the drive circuit. The material may be affixed to the lens in any manner as apparent to those of ordinary skill in the art in view of this disclosure.

In the exemplary embodiment, an adhesive used to attach the liquid crystal to the lens 108 is an electrically conductive adhesive. Use of the conductive adhesive avoids the use metal wires on the face of the lens 108. The use of the adhesive enhances the cosmetics of the lens 108 as well as eliminating the cost of edging the liquid crystal with copper or other conductive material. One suitable adhesive is sold under the designation NOELLE 805-19 system, a two component (A+B) high performance, silver filled, room temperature curing adhesive that is available from Noelle Industries, Adhesives, Coatings and Conductives, 83 Alexander Rd., Unit 3 Billerica, Mass. 01821.

Figure 2:
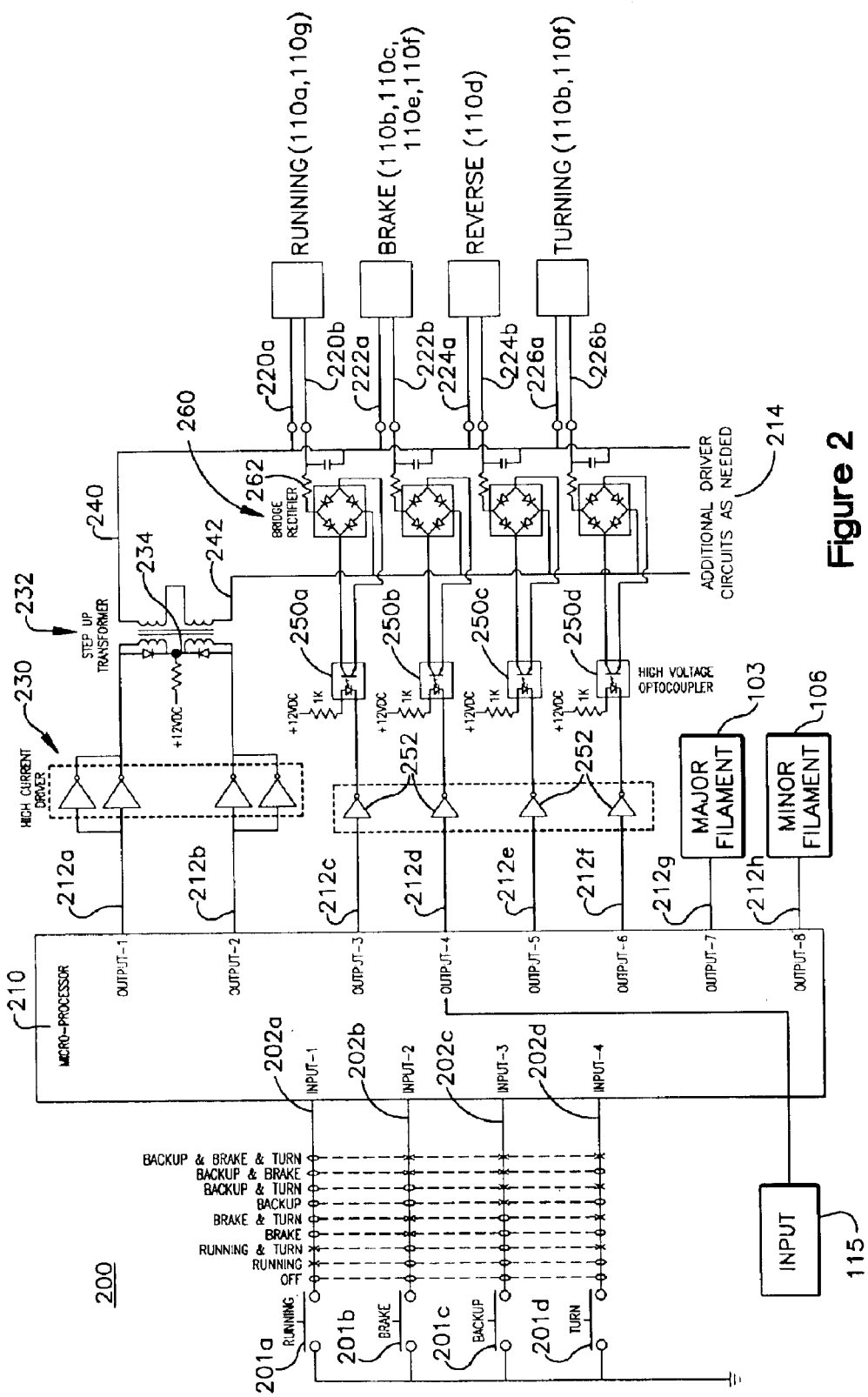
FIG. 2 is a schematic depiction of a drive circuit for activating control components of the taillight assembly according to the present invention.

Referring now to FIG. 2, the drive circuit 200 includes inputs 202a, 202b, 202c, and 202d to a programmable controller 210. The programmable controller includes a control program operating system that responds to the signals on the inputs 202a, 202b, 202c and 202d to produce a set of controller outputs 212a, 212b, 212c, 212d, 212e and 212f. A driver circuit 214 is coupled to the material to apply a pulse width modulated signal to the material for altering the light transmissive characteristics of the material. In accordance with the disclosed exemplary embodiment of the invention, the highest light transmission occurs when the band is activated with a significant alternating current square wave signal. The larger the amplitude the greater the light transmission.

In accordance with the disclosed embodiment of the invention, there are seven bands 110a, 110b, 110c, 110d, 110e, 110f and 110g of material. Each band is independently controlled by the controller 210. Thus, by referring to FIG. 2, one sees that the bands 110a and 110g are coupled to two conductors 220a, 220b, the bands 110b, 110c, 110e and 110f are coupled to two conductors 222a, 222b, the band 110d is coupled to two conductors 224a, 224b, and the bands 110b and 110f are coupled to two conductors 226a, 226b. As shown, the bands can be coupled to more than one conductor. This is to allow the bands to perform multiple functions for different taillight applications. For instance, bands 110b, 110c, 110e and 110f can perform both brake and turn functions. Therefore, the bands 110b, 110c, 110e and 110f are coupled to the drive circuit 200 by multiple conductors. The bands 110a, 110b, 110c, 110d, 110e, 110f and 110g may include two pieces of material stacked one on top of the other. In addition, the liquid crystal material may include a dichroic dye for meeting the coloring standards for the different taillight functions. The bands of material may be dyed with dichroic dyes of various colors. For discussion purposes only, the two colors in use will be referred to as red and yellow. Dichroic dyes give the material the ability to be colorized when an electric current is applied, clear in the absence of electric flow, and a gradient between the two, determined by the drive voltage level.

There are set SAE standards regarding the color output and surface area of the respective lamp sections. These surface areas are met by the dimensions of the liquid crystal bands or regions. For example, the SAE standard for minimum brake surface area is 37.5 $cm^2$ for a single region. For multiple regions, each region must be a minimum of 22 $cm^2$ per region. The SAE standard for reverse light surface area must be a single region with a minimum surface diameter of 25 mm. Other standards are applicable and are known in the art. The color standards may be met by the incorporation of colored lenses, dichroic dyes, or combinations thereof. The dyes may be used alone or in combination with optical developments in the reflector. In addition, in the preferred embodiment, wire leads are employed and serve to carry the drive voltages from the drive circuit 214 to the liquid crystal bands or regions.

An input sensor 115 communicates with the controller 210 to modify the output 112d that controls the brake bands 110b, 110c, 110e and 110f. This sensor measures the pressure applied to the brake pedal by a motorist and sends a signal of the pressure amount to the controller 210. The controller 210 then modifies the light transmitting properties of the brake bands 110b, 110c, 110e and 110f to correspond to the pressure applied to the brake pedal as measured by the sensor. For instance, the more pressure that is applied to the brake pedal, the more light transmissive the brake bands 110b, 110c, 110e and 110f will be rendered, thus making a more intense brake light. Other sensors can be applied to modify the light transmitting properties of the bands as apparent to one of ordinary skill in the art in view of this disclosure.

The drive circuit has four input contacts 201a, 201b, 201c, 201d controlled by switches for creating different control states. The controller 210 also may be programmed to adjust the light transmitted from the taillight assembly to respond to different functions from sensors or switches controlled by the motorists.

So long as the controller 210 is powered up by a signal from the twelve volt signal from the motor vehicle battery, the controller 210 provides pulsed on/off signals at two outputs 212a, 212b. These pulses pass through high current inverter drivers and have a duty cycle of 50%. These pulses pass through high current inverter drivers 230 to step up transformer 232. The step up transformer 232 has a center tap 234 coupled to the twelve volt output from the vehicle battery. The transformer produces an alternating square wave signal across two bus conductors 240, 242 that alternates back and forth between +40 volts and −40 volts at a frequency of 64 hertz.

As stated above, the programmable controller 110 also produces signals at outputs 212c, 212d, 212e and 212f for controlling a light transmissive characteristic of the bands 110a, 110b, 110c, 110d, 110e, 110f and 110g. These outputs from the controller 210 are 128 hertz, pulse width modulated, square waves. The width of the pulse determines the light intensity from the light source 102 transmitted by an associated control element of material. Each of the outputs, 212c, 212d, 212e and 212f is coupled to an associated optoisolator 250a, 250b, 250c and 250d through an inverting, high current drive amplifier 252. Consider output 212c. When this output goes high, the inverter produces a low signal which turns on a light emitter of the optoisolator 250a. This in turn, turns on a transistor of the optoisolator 250a, thereby transmitting the pulse to a bridge rectifier 260. The bridge rectifier acts as a valve to transmit the 64 hertz signal across the bus conductors 240, 242 across an associated control element. Additionally, the controller 210 has two additional outputs 212g, 212h for controlling light source filaments on a dual filament light source. Output 212g controls the major filament 103 while output 212h controls the minor filament 106. The activation of the filaments 103, 106 is controlled by the controller 210 and is dependent of the light function being performed. The activation is a simple on or off control. For example, during the running light application the minor filament is activated by the controller while the major filament is deactivated. During other taillight functions, such as brake, the major filament is activated and the minor filament is deactivated. When the major filament is activated for higher output taillight functions bands performing a lower output light function are adjusted by the controller 210 to compensate for the increased light output from the light source. For example, when brake and running are occurring simultaneously, bands 110a, 110b, 110d, 110f and 110g are rendered more opaque to compensate for the increased light output by the major filament so as to maintain running appearance. Whereas, the brake bands 110c and 110e are made less opaque and more light transmissive to meet the standards for brake light output.

In other embodiments, the light source can consists of a single intensity light output rather than the multiple intensity light output (such as in the dual filament bulb). In the case of a single light output source, the light source can be coupled at either output 212g or 212h. The output that is not in use is simply deactivated by the controller 210. To meet the light output standards for the single intensity light source, the controller 210 alters the light transmissive properties of the bands 110a–110g to allow for the single intensity light source. For example, during braking, bands 110a, 110b, 110d, 110f and 110g are rendered more opaque and less light transmissive to meet the light output for running light and bands 110c and 110e are rendered less opaque and more light transmissive to meet the standard light output for a brake light.

The pulse width of the 128 hertz signal at the outputs 212c, 212d, 212e and 212f determines the light intensity of the light transmitting portions of the housing. The pulse width controls the on time of a bridge rectifier by switching the associated optocoupler on and off. This in turn determines a length of time that the 64 hertz signal from the transformer is applied to an associated liquid crystal member. A resistor 262 (10K) and a capacitor 264 (1 microfarad) determine the rate at which the voltage can rise across the liquid crystal member. Given more time (wider pulse), the voltage will go higher and increase the light intensity transmitted through an associated control element such as one of the bands 110a, 110g. Given less time (narrow pulse), the voltage intensity will be lower and decrease the light intensity. The controller 210 can control the pulse width in increments of 30 microseconds (0.000030) providing good resolution on light intensity control. Additionally, the controller can control the pulse width based on an input from a sensor such as shown as input sensor 215. In one exemplary embodiment, however, the material is either rendered essentially transparent due to application of the +−40 volt signals from the transformer or is rendered opaque by blocking all signals from the transformer. A high transparent state is accomplished by application of a constant high output signal from the controller. Using the programming capability of the controller 210 it is possible to control a level of opacity of each individual liquid crystal band in order to optimize the taillight assembly performance. The operating system of the controller 210 can be programmed with preset levels of opacity base upon the type of application selected. The opacity for a particular band may be programmed or adjusted depending on the configuration of the lamp assembly.

Referring now to FIGS. 3a–3m, a seven band liquid crystal configuration for the front of a taillight assembly is shown. FIGS. 3a through 3m illustrate the different taillight functions being performed. Bands 110b and 110f include two pieces of liquid crystal material stacked in relation to each other. One piece of liquid crystal changes from clear to red (the intensity of the red color is controlled by the controller as previously stated) and the other piece changes from yellow to clear (again the intensity of the yellow color is controlled by the controller). In the following illustrations, it is assumed that where the bands 110b and/or 110f are used in a red appearance application (i.e., running or brake) the clear to red band is in the red state and the clear to yellow is in the clear state. Likewise, where a yellow appearance is required (i.e., turn or parking light), the clear to red piece of liquid crystal is in the clear state and the clear to yellow is in the yellow state. The other bands 110a, 110c, 110d, 110e and 110g include one piece of liquid crystal material which changes from clear to red.

Figure 3A:
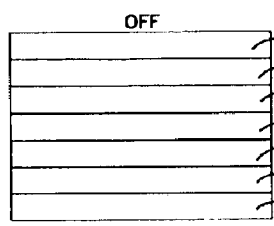
FIGS. 3a through 3m show taillight functions in a seven-band liquid crystal design for use in the taillight assembly of the present invention.
Figure 3B:
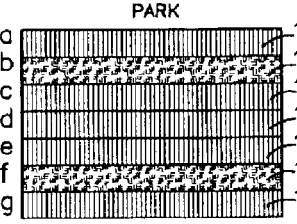

FIG. 3a shows the bands 110a, 110b, 110c, 110d, 110e, 110f and 110g in the off state. In this state, the bands 110a, 110b, 110c, 110d, 110e, 110f and 110g can either be rendered completely light transmissive or colored opaque for cosmetic purposes. In either case, no functional taillight application is being performed. FIG. 3b shows the bands 110a, 110b, 110c, 110d, 110e, 110f and 110g during the parking light application. Bands 110a, 110c, 110d, 110e and 110g are rendered light transmissive by the controller 110. In addition, a dichroic dye is present in the liquid crystal material to allow the bands 110a, 110c, 110d, 110e and 110g to take on a red appearance. Bands 110b and 110f are rendered light transmissive and take on a yellow appearance as is customarily used for the parking light.

Figure 3C:
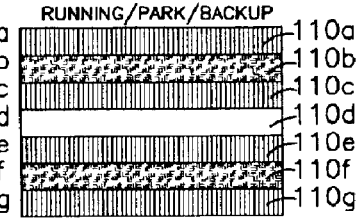
Figure 3D:
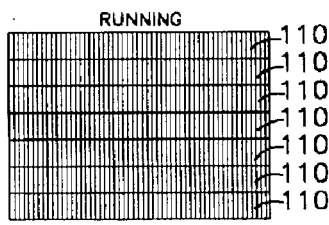

FIG. 3c shows a combination of running light, parking light and reverse light. Bands 110a, 110c, 110e and 110g are rendered light transmissive with a red appearance with running light intensity. Bands 110b and 110f are rendered light transmissive with a yellow appearance with parking light intensity. The stacked liquid crystal material in bands 110b and 110f have the clear to red band in the clear state and the clear to yellow band in the yellow state. Band 110d is rendered clear and light transmissive for reverse lighting. In FIG. 3d shows the bands in the running light state. All of the bands 110a, 110b, 110c, 110d, 110e, 110f and 110g are rendered red and light transmissive. For running light application, bands 110b and 110f have clear to yellow piece of liquid crystal in the clear state. Running is the state of the taillight when the vehicle head lamps are turned on.

Figure 3E:
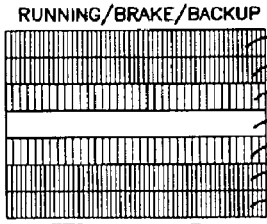
Figure 3F:
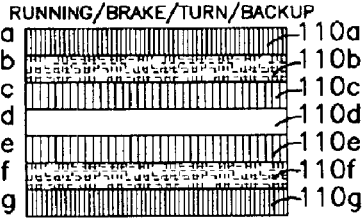

FIG. 3e shows a running, brake and backup combination. Bands 110a, 110b, 110f and 110g are rendered red and light transmissive for the running light application. Bands 110c and 110e are rendered red and light transmissive, however, the intensity of the light transmitted through these bands is increased to meet the standards for brake application. Finally, band 110d is rendered clear and light transmissive for reverse lighting. FIG. 3f illustrates running light, brake light, turning signal and backup. Bands 110a and 110g are red and light transmissive for the running application. Bands 110c and 110e are red and light transmissive with an increased intensity for brake application. Bands 110b and 110f have the clear to red band of liquid crystal material alternating from clear to red while the clear to yellow band alternates from clear to yellow. The alternation of the stacked liquid crystal is such that the bands take on a "blinking" red to yellow appearance, thus providing a turning signal. Finally, band 110d is clear and light transmissive for reverse light function.

Figure 3G:
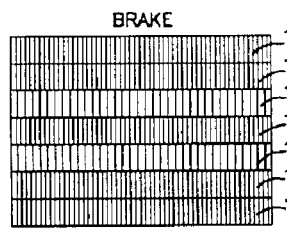
Figure 3H:
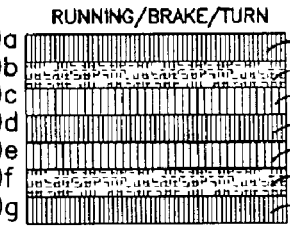

FIG. 3g shows a brake application. All of the bands 110a, 110b, 110c, 110d, 110e, 110f and 110g are rendered red and light transmissive. However, bands 110c and 110e have an increased intensity to meet the brake light requirement. This configuration allows for running lighting while at the same time providing brake lighting. FIG. 3h illustrates a running, brake and turn application. Bands 110a, 110d and 110g are made red and light transmissive for running application. Bands 110c and 110e are rendered red and light transmissive with increased light output intensity for brake application. Finally, bands 110b and 110f are used for the turn application in the same manner as described above.

Figure 3I:
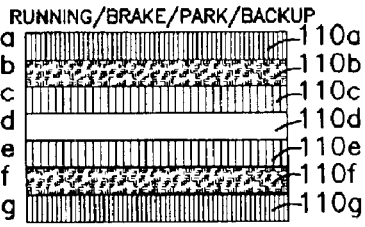
Figure 3J:
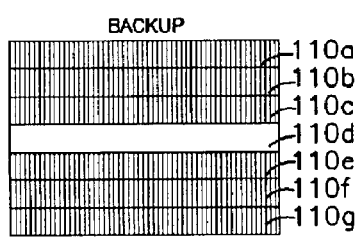
Figure 3K:
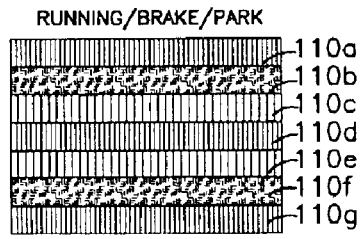
Figure 3L:
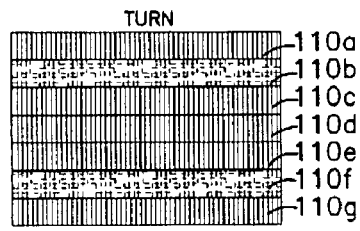
Figure 3M:
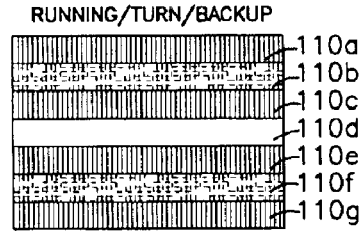

FIG. 3i shows a combination of running light, brake light, parking light and reverse light. Bands 110a and 110g are made red and light transmissive for the running application. Bands 110c and 110c are rendered red and light transmissive with increased light intensity being emitted for brake applications. Bands 110b and 110f are used for turning light in the same manner as described above. Finally, band 110d is clear and light transmissive for reverse light. FIG. 3j shows the reverse function with running light. Bands 110a, 110b, 110c, 110e, 110f and 110g are made red and light transmissive while band 110d is rendered clear and light transmissive. FIG. 3k shows a running, brake and parking combination. Bands 110a, 110d, and 110g are made red and light transmissive for the running application. Bands 110c and 110e are red and light transmissive with increased light transmission for the brake application. Bands 110b and 110f are used for turning as described previously. FIG. 3l shows a turn with running light. Bands 110a, 110c, 110d, 110e and 110g are rendered red and light transmissive for the running application while bands 110b and 110f are used for turn in the manner previously disclosed. Finally, FIG. 3m shows a running, turning and reverse light application. Bands 110a, 110c, 110e and 110g are rendered red and light transmissive for running light. Band 110d is made clear and light transmissive for reverse light. Bands 110b and 110f are used for turning consistent with this disclosure.

In any of the proceeding sequences, rear fog lighting can be accomplished. Bands 110c and 110e can include two pieces of stacked liquid crystal material. Similar to the turning signal bands, one will change from clear to red while the other band will change between clear and yellow. When the rear fog lighting is actuated, the clear to red band is rendered clear while the clear to yellow band is rendered yellow. Unlike the turn signal bands, the fog bands do not alternate from red to yellow but maintain a constant yellow state, transmitting the necessary yellow light for the fog application.

The band configurations for FIGS. 3a through 3m are summarized in the following table:

The light source referred to in Table 1 is a dual filament bulb as previously disclosed. Below is an explanation of Table 1.

The "X" represents that a band is transmissive enough for running appearance. This in turn means that a set level of drive voltage has been imparted upon that band in order to make it opaque to a predetermined level. The predetermined level of opacity is maintained in order to create the light field or contribute to the creating of a light field, which meets the SAE and FMVSS standards for the running lamp function. Other standards for taillight applications, such as SAE J1319, hereby incorporated by reference in its entirety, may also be complied with using the seven band design.

The triangle " " symbol in the key explains a state of "alternating yellow to red for turn." This situation is created by the overlapping of two pieces of liquid crystal material in that particular band, one band of liquid crystal material alternates from clear to yellow, and the other from clear to red. There are two schemes, which the drive circuit switches between to create the alternating yellow to red appearance. One is that the clear to yellow liquid crystal is clear and the clear to red liquid crystal is red. This give the appearance of a red band. The other scheme is the reverse, the clear to yellow liquid crystal is yellow and the clear to red liquid crystal is clear giving the band a yellow appearance. By switching between these two schemes the drive circuit creates the appearance of a band blinking yellow, with a normal state of red, thus creating the turn signal light field.

The next key element is the square "☐" representing the reverse light. The SAE and FMVSS standards require a white light output for reverse function. However, that is the only time at which white light can be emitted from the taillight. Therefore, band 4 has liquid crystal in place, which switches from clear to red, allowing the white light to pass through during reverse lamp function, but tinting the band red (taillight function appearance) during other functions.

The next element is the circle "◯" representing the liquid crystal state of a band for brake appearance. This means simply that the liquid crystal is made clear to a point which allows enough light to pass through creating the light level needs of the brake function, while maintaining a red color. This level output is different from the running lamp level due to the fact that the major filament (in a two filament embodiment) is lit to create the light output for the brake function.

Finally, the plus "+" symbol represents the liquid crystal state of a band for parking light appearance. This operates on the same bands as that of the turning light. However, during

TABLE 1

| Lamp Function | Filament Action | Band 110 a | Band 110 b | Band 110 c | Band 110 d | Band 110 e | Band 110 f | Band 110 g |
|---|---|---|---|---|---|---|---|---|
| Running | Minor | X | X | X | X | X | X | X |
| Park | Minor | X | + | X | X | X | + | X |
| Brake | Major | X | O (X) | X (O) | X | X (O) | O (X) | X |
| Turn | Major | X |  | X | X | X |  | X |
| Reverse | Major | X | X | X | ☐ | X | X | X |
| Brake + Turn | Major | X |  | O | X | O |  | X |
| Brake + Reverse | Major | X | O (X) | X (O) | ☐ | X (O) | O (X) | X |
| Brake + Turn + Reverse | Major | X |  | O | ☐ | O |  | X |

X-running appearance (red and light transmissive)
O-braking appearance (bright red and light transmissive (variable))
☐-reverse appearance (white and light transmissive)
 -turning appearance (alternating yellow to red and light transmissive)
+-park (yellow and light transmissive)

the parking function, the band of liquid crystal that alternates from clear to red is in the clear state. The other band which alternates from clear to yellow is in a constant yellow state, thus providing a constant yellow parking light. Here, with use of a dual filament bulb, the minor bulb is lit while the major filament is extinguished. This gives a lower light output for running applications.

Table 1 also shows that the protocol at all times creates the running taillight function in at least bands 1 and/or 7. This is to create a reference light level for the other functions so as not to create any confusion for other motorists, for example, between running mode and brake mode.

In addition, Table 1 shows one possible protocol to achieve the various lamp output functions. In parenthesis of the brake and brake with reverse row, the only change to the protocol which would be necessary to avoid the dual usage problem described earlier is disclosed. When attempting certain styling options regarding shape and size of the lamp, there can be many variations of both the band orientation as well as the drive circuit protocols.

Turning now to FIG. 4, a four band design is shown. FIG. 4a shows the four band design in the completely "off" state. The liquid crystal material of the four band design operates in a manner consistent with the seven band design. Therefore, the bands 410a, 410b, 410c and 410d could be rendered clear and light transmissive or colored and light transmissive in the "off" state. FIG. 4b shows a turning application with the four band design. Bands 410a, 410b and 410d are rendered red and light transmissive providing running appearance. Band 410c contains stacked liquid crystal material to provide for turning signal as disclosed with the seven band design. FIG. 3c shows a brake and reverse combination where band 410b is clear and light transmissive to provide a reverse light while band 410a, 410c and 410d are red. Bands 410c and 410d providing running appearance and band 410a being of greater intensity to provide for breaking. FIG. 4d shows a running light application. All bands 410a, 410b, 410c and 410d are rendered red and light transmissive for running light. FIGS. 4e, 4f, 4g, 4h and 4i show various taillight application in a four band design. The bands operate in a manner consistent with the seven band application. Therefore, further explanation is unnecessary in view of the Figures.

FIGS. 5a through 5d show a two band design. The two band design is the simplest design which can incorporate all the necessary taillight functions. FIG. 5a shows a running application where bands 510a and 510b are red and light transmissive. FIG. 5b shows a turning signal along with running light. Band 510a contains stacked liquid crystal material for use in the turning application consistent with the previous disclosed embodiments. Band 501b maintains the running appearance. FIG. 5c shows a brake application. Band 510a is red and light transmissive with increase light transmittance for brake function. Band 510b is red for running appearance. Finally, FIG. 5d shows a reverse light application. Here, band 510a is clear and light transmissive while band 510b maintains the running appearance.

FIGS. 4 and 5 depict of various designs made possible by this invention. As the design of the taillight assembly is simplified (such as in the four band or two band design), the functionality becomes more limited and the operational options are reduced. For example, in the simplest design (such as in a one band design), two large pieces of liquid crystal are layered are utilized in a similar manner as the other stacked bands as previously discussed. However, in this simple design, the lamp is capable of only one function at a time. When engaging brake you lose the running light, when engaging the turning light you lose brake light and running light. In addition, when the backup light is actuated, it is the only function capable of display during operation. By adding an additional band to this design the running light can be retained during turn and brake function, and the brake function can be retained during backup. As such, more bands will allow for simultaneous functions to be performed.

Figure 6A:
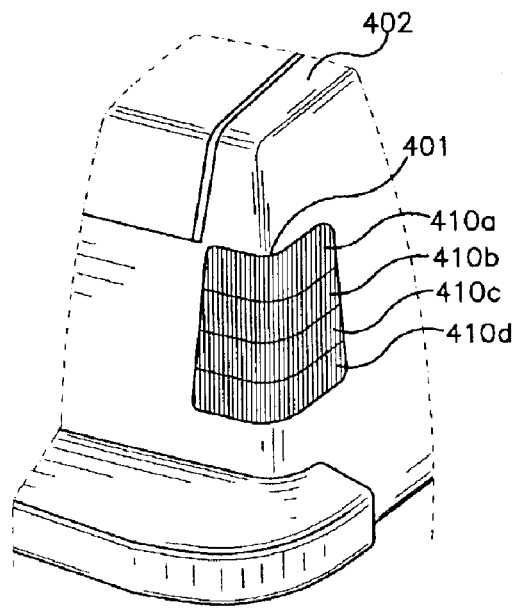
FIGS. 6a through 6d show a wrap-around, four-band liquid crystal taillight assembly according to the present invention on a motor vehicle.
Figure 6B:
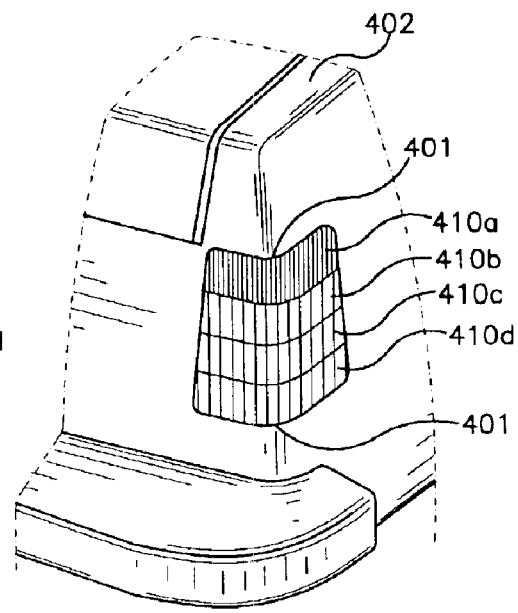
Figure 6C:
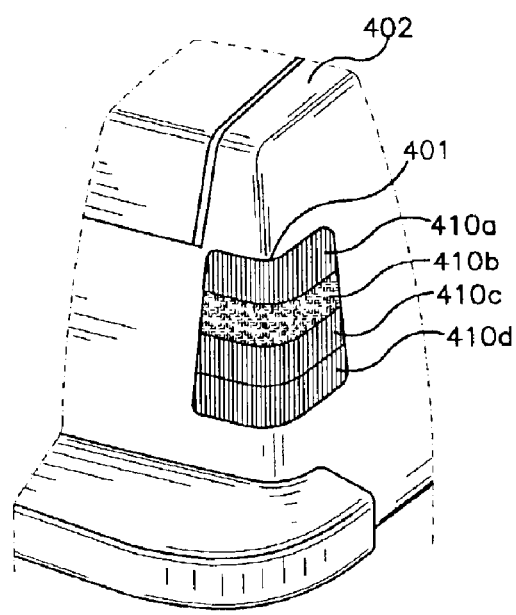
Figure 6D:
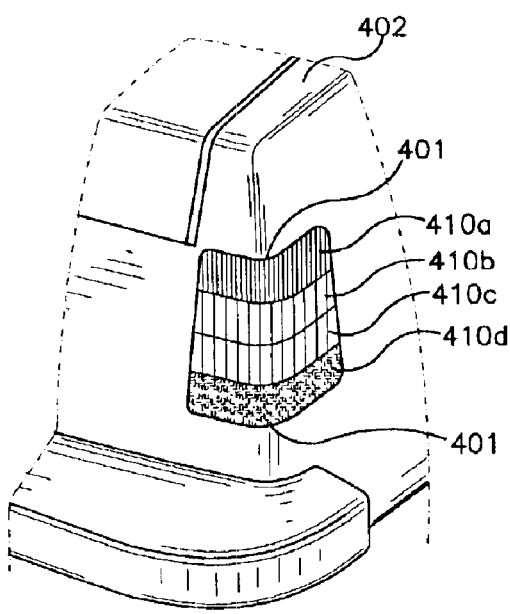

FIGS. 6a through 6d show a taillight assembly 401 having four bands 410a, 410b, 410c and 410d in place on the rear of a motor vehicle 402. The four band design operates in the same manner as that of FIG. 4. FIG. 6a shows the running application. FIG. 6b shows a brake appearance. FIG. 6c illustrates a turning signal with running light. Finally, FIG. 6d shows a combination brake and turn function. Only four applications are shown in FIG. 6, however, more may be included as apparent to one of ordinary skill in the art in view of this disclosure.

Another four-band configuration is shown in FIG. 7. Instead of the bands being in a rectangular configuration, the bands are circular in shape. FIGS. 7a through 7f depict the following taillight appearances:

FIG. 7a-running; FIG. 7b-brake/running; FIG. 7c-turn signal/running; FIG. 7d-brake/turn/running; FIG. 7e-brake/reverse/running; and FIG. 7f-brake/turn/reverse/running.

Turning to FIG. 8, shows a the rear of a motor vehicle having a body 501 and a trunk 503 employing a variation of the four band design. Each side of the body contains two bands 410a and 410b. In addition, each side of the trunk includes two bands 410c and 410d. The bands operate in the same manner as previously disclosed for a four band system.

Referring to FIG. 9, a broad housing design is shown. The liquid crystal is divided into six sections or bands 610a, 610b, 610c, 610d and 610e. Each section is has a similar corresponding section on the opposite side of the design so that, for example, if the brake section is activated, one section on each side of the design will signify that the brake is being activated. Each section operates in a manner consistent with this disclosure and may have stacked liquid crystal material, if needed, in order to accomplish all taillight functions.

While the above examples show a taillight using the present invention, a center high mounted stop light (CHMSL) can also employ the concepts herein disclosed. For instance, the CHMSL can be two band design where the bands are situated next to each other. These bands may be stacked to provide for different rear lighting applications. The operation of the bands would be consistent with the other examples as previously disclosed. With the stacked liquid crystal material, all major rear lighting applications associated with CHMSL devices can be accomplished.

While the exemplary embodiments of the invention have been described with a degree of particularity, it is the intent that the present invention include all modifications and alterations from the disclosed design falling with the spirit or scope of the appended claims.

I claim:

1. A taillight assembly comprising:
   a light source for emitting light from said assembly;
   a light source enclosure having a light transmissive portion for transmitting light from the light source to an illumination zone, a portion of said enclosure including a material which is fixed in relation to selected regions of the light transmissive portion of the enclosure and which when electrically energized to alter the light transmitting properties of the material for performing different taillight functions, and, a drive circuit electrically coupled to the material in each region for selectively energizing the material and thereby controlling the functional light output of each region.

2. The taillight assembly of claim 1 wherein said material is molded into the light transmissive portion of the enclosure.

3. The taillight assembly of claim 1 wherein said material is affixed to the inner or outer surfaces of the light transmissive portion of the enclosure.

4. The taillight assembly according to claim 1 wherein the said material comprises liquid crystal material.

5. The taillight assembly according to claim 4 wherein said liquid crystal material is polymer stabilized technology (PST) liquid crystal.

6. The taillight assembly according to claim 4 including a polarized filter.

7. The taillight assembly of claim 4 wherein the liquid crystal material comprises dichroic dyes.

8. The taillight assembly of claim 1 wherein at least one region is layered with two or more portions of liquid crystal material which are electrically energized to adjust the light transmitting properties and function of the region.

9. The taillight assembly according to claim 1 wherein said functions include running light, brake light, reverse light parking light and turn signal light.

10. The taillight assembly of claim 1 wherein the regions comprise parallel bands or strips.

11. The taillight assembly of claim 1 wherein the drive circuit includes an interface for monitoring multiple inputs that control the light transmitting properties and function of the material.

12. The taillight assembly of claim 11 wherein said input is a brake pressure sensor which corresponds to the intensity of the light emitted during braking based on the pressure applied to the brake pedal by the motorist.

13. The taillight assembly of claim 1 wherein said light source comprises a first filament and a second filament, wherein said first filament emits low-level light output for low-level light functions and said second filament emits high-level light output for high level light functions.

14. The taillight assembly of claim 1 wherein the light transmitting portion of the enclosure comprises inner and outer layers and wherein the material is supported between the inner and outer layers of the light transmitting portion.

15. The taillight assembly of claim 14 wherein the material comprises distinct regions that are individually energized by conductors that are routed between the inner and outer layers of the light transmitting portion of the enclosure.

16. The taillight assembly of claim 1 wherein the material is supported by a separate enclosure cap that positions the material a spaced distance from the light transmitting portion of the enclosure to reduce heat transfer to the material from a light source within the enclosure.

17. The taillight assembly of claim 1 wherein the material is attached to the light transmitting portion of the enclosure with an adhesive material.

18. The taillight assembly of claim 17 wherein the adhesive material is a conductive adhesive that forms a portion of a conductive path between the drive circuit and the material.

19. The taillight of claim 1 wherein the drive circuit comprises:
a user interface including a switch selector;
a programmable controller for responding to the setting of the switch selector to produce a set of driver outputs; and
a driver circuit coupled to the material to apply an alternating signal to the material to alter the light transmitting properties and function of the coating material.

20. The taillight assembly of claim 19 wherein the drive circuit includes a control output for adjusting a level and function of light transmission through a region of the material depending upon an activation state of the light source.

21. The taillight assembly of claim 19 wherein the driver circuit applies a direct current (DC) signal output for adjusting the light transmission level of an associated region of the material.

22. A taillight assembly comprising:
a light source for emitting light from said assembly, said light source comprising a first filament and a second filament, wherein said first filament emits low-level light output for low level light functions and said second filament emits high-level light output for high level light functions;
a light source enclosure having a light transmissive portion for transmitting light from the light source to an illumination zone, a portion of said enclosure including a material which fixed in relation to selected regions of the light transmissive portion of the enclosure and which when electrically energized alters the light transmissive properties of the material for performing different taillight functions; and,
a drive circuit electrically coupled to the material in each region for selectively energizing the material and thereby controlling the functional light output of each region.

23. The taillight assembly according to claim 22 wherein the said material comprises liquid crystal material.

24. The taillight assembly according to claim 23 wherein said liquid crystal material is polymer stabilized technology (PST) liquid crystal.

25. The taillight assembly of claim 22 wherein at least one region is layered with two or more portions of liquid crystal material which are electrically energized to adjust the light transmitting properties and function of the region.

26. The taillight assembly of claim 22 wherein the drive circuit includes an interface for monitoring multiple inputs that control the light transmitting properties and function of the material.

27. The taillight assembly of claim 26 wherein said inputs include a brake pressure sensor which corresponds to the intensity of the light emitted during braking based on the pressure applied to the brake pedal by the motorist.

28. A process for constructing a taillight assembly comprising:
positioning a light source that emits light within an enclosure having a light transmissive portion for transmitting light from the light source to an illumination zone;
fixing a material in relation to the enclosure and selected regions of the light transmissive portion, and
coupling the material to a drive circuit for selectively energizing the material which when electrically energized alters the light transmitting properties of the material for performing different taillight functions.

29. The process of claim 28 wherein the material is coupled to the light transmissive portion in layers that are isolated from each other to allow independent energization of overlapping layers of said material.

30. The process of claim 28 wherein the material is organized in multiple sections across a surface of said light transmissive portion of the headlamp assembly, wherein each section of material is coupled to the drive circuit independently to allow independent control over the light transmitting characteristics and function of said sections during operation of the taillight assembly.

31. The method of claim 28 wherein there are multiple sections of material applied to the light transmissive portion of the assembly are coupled to the drive circuit to independently control the light transmissive states and function of the sections to provide a running light, reverse light, parking light, brake light, and turn signal light.

32. The method of claim 30 additionally comprising providing an user interface for monitoring multiple inputs that control the light transmissive state and function of the multiple bands.

33. The method of claim 28 wherein energizing of the material is performed by providing a pulse width modulating signal for adjusting a light transmission state and function of an associated section of said material.

* * * * *